United States Patent [19]
Robbins

[11] Patent Number: 5,973,464
[45] Date of Patent: Oct. 26, 1999

[54] INTERMITTENT AUTOMATIC WINDSHIELD WIPER CONTROLLER

[75] Inventor: Ronny C. Robbins, Balto., Md.

[73] Assignee: The United States of America as represented by the Secretary of the Army, Washington, D.C.

[21] Appl. No.: 08/969,534

[22] Filed: Sep. 12, 1997

[51] Int. Cl.$^6$ ........................................ B60S 1/08
[52] U.S. Cl. ..................... 318/444; 318/DIG. 2; 15/250.13
[58] Field of Search ...................... 318/443, 444, 318/445, 484, DIG. 2; 388/907.5, 921; 15/250.12, 250.13, 250.17

[56] References Cited

U.S. PATENT DOCUMENTS

| | | | |
|---|---|---|---|
| 4,375,610 | 3/1983 | Nagaoka et al. | 318/444 |
| 4,388,574 | 6/1983 | Bois et al. | 318/443 |
| 4,492,904 | 1/1985 | Graham | 318/444 |
| 5,254,916 | 10/1993 | Hopkins | 318/443 |
| 5,412,296 | 5/1995 | Chien et al. | 318/444 |

*Primary Examiner*—Bentsu Ro
*Attorney, Agent, or Firm*—Ulysses John Biffoni; Vincent J. Ranucci

[57] ABSTRACT

An apparatus for intermittently controlling windshield wipers, comprising a setting switch which is capable of being manually activated, a microcontroller responsive to the activation of the setting switch, means for programming a time interval into the microcontroller in response to activation of said setting switch, whereby the microcontroller initiates a sweeping action of the windshield wipers corresponding to the time interval between activations of the setting switch and continues to initiate a sweeping action of the windshield wipers during the programmed time interval until a subsequent activation of the setting switch, and, either means for decreasing the time interval after setting of the programmed time interval by a single subsequent activation of the setting switch or means for increasing the time interval after setting of the programmed time interval by two subsequent activations of the setting switch. A method for intermittently controlling windshield wipers is also disclosed.

10 Claims, 1 Drawing Sheet

INTERMITTENT AUTOMATIC WINDSHIELD WIPER CONTROLLER

Government Interest

The invention described herein may be manufactured, licensed, and used by or for the U.S. Government.

BACKGROUND OF THE INVENTION

1. Field of the Invention

The present invention relates to a device and method for controlling windshield wipers. More particularly, the device and method control the intermittent rate of automatic wipers. The device and method allow a driver of a vehicle to select the windshield wiper rate with a simple adjustment, eliminating excessive distractions. This enhances the safety of the driver during foul weather/rain conditions.

2. Brief Description of the Prior Art

Windshield wipers are well known in the art. Additionally, regulating devices for the windshield wipers are known. However, several disadvantages exist for presently known windshield wiper devices which have controlled rates of oscillation.

Windshield wipers are used on vehicles to wipe precipitation from the windshield, giving the driver an unobstructed view. Windshield wipers are used on automobiles, trucks and other vehicles which have a driver who needs visual references to operate the vehicle. Although primarily used for rain, windshield wipers may be used for any other occurrence, such as snow or hail, which requires a wiping motion of the windshield to give the driver proper visibility. Wipers enable a driver to operate a vehicle in a safe manner.

Traffic accidents occur quite frequently during rain conditions on the roadways. Drivers proceeding along roadways are accustomed to traveling with a full field of vision. Roadways are designed for, and posted speed limits are set for, ideal driving conditions. As rain dims the driver's vision and interferes with the driving characteristics of a vehicle, driving becomes hazardous. The driver's vision is blocked by the water droplets on the windshield and the driver's field of vision is decreased, adding to the importance of the visual reference points which remain discernable by the driver.

Driver reaction time is extremely important during these rain conditions. With decreased visibility, decreased field of vision, unfamiliar driving conditions and reduced lighting along the road, any distraction encountered by the driver increases the possibility of an accident. Especially important, are distractions which occur over significant periods of time, which in the case of driving, may be only seconds. Any occurrence which requires a driver to do mental calculations, to refocus the driver's visual reference from outside to inside the vehicle, or to do any additional manipulative steps while driving, increases the risk of an accident. With rain as a major contributor to the multitude of yearly traffic accidents and the continual increase in the number of cars in the United States and throughout the world each year, there can be anticipated a corresponding increase in the accident rate.

In order to aid drivers to negotiate these rain hazards, the art of windshield wipers has developed to add specific functions to the mechanization of the wipers. These functions have played an important role in decreasing the number of distractions and occurrences of those distractions for drivers. Additionally, these functions have increased the ability of drivers to maintain proper vigilance during driving. One of the most important aspects of the improvements in the windshield wiper art is improving visibility.

Most commercially available wipers have essentially similar structures and functions with some minor differences. These differences include such features as modifications in the sweeping operation of intermittent mode or location of the activating device. Additionally, the wipers are generally molded in one of two patterns, either the wipers sweep at a predetermined rate or the wipers are designed to permit a driver to adjust the sweeping rate with a manually activated fine tuner to optimize the sweeping rate to the amount of rain fall.

Wipers which contain a predetermined wiper rate present a problem in not allowing drivers to optimize the wiper rate to the current rain conditions. This problem is improved with the use of a fine tuner mechanism. With the fine tuner mechanism, the driver adjusts a fine tuner according to the rain conditions currently observed by the driver. However, the driver is forced to continually try various settings to attain the appropriate sweeping interval for the existing rain conditions.

One variation of the fine tuning feature of windshield wiper is disclosed in U.S. Pat. No. 5,412,296 (Chien et al.). Chien et al. discloses a computer-aided self-learning intermittent windshield wiper controller. The patent discloses pushing a switch to an intermittent mode and turning back to start a wiper cycle. The driver then turns the switch to the intermittent mode a second time when the driver's vision becomes obscured. The interval between the first and second sweep is memorized, and the wiper repeats the memorized period of sweep. The rate of sweep is increased and decreased by switching off the wiper and switching back to the intermittent mode to adjust the wiper rate. Although this refinement of the fine tuning wiper aids the driver, it does not permit a driver to change the wiper speed rate with a minimum number of manual manipulations of the fine tuner mechanism.

In view of the foregoing, improvements in windshield wipers have been desired. In addition to the increase the optimal use of the wiper rate to rain fall, a decrease in the number and time of driver distractions is desired for the device and method to further ensure the safety of the driving public.

The present invention addresses these needs.

SUMMARY OF THE INVENTION

It is an object of the present invention to provide an apparatus for the adjustment of windshield wiper rates which is simple to activate.

Additionally, it is an object of the present invention to provide an apparatus which requires a minimum number of steps in the performance of adjusting wiper rates, and sets the wiper rate to exactly the rate desired by the driver based on weather conditions.

These and other objects are achieved by the present invention which includes an apparatus for intermittently controlling windshield wipers, comprising a setting switch which is capable of being manually activated, a microcontroller responsive to activation of said setting switch, means for programming a time interval into said microcontroller in response to activation of said setting switch, whereby said microcontroller initiates a sweeping action of said windshield wipers corresponding to the time interval between activations of said setting switch and continues to initiate a sweeping action of said windshield wipers during said programmed time interval until a subsequent activation of said setting switch, and, means for decreasing said time interval after setting of said programmed time interval by a single subsequent activation of said setting switch.

In another aspect of the present invention, there is provided an apparatus for intermittently controlling windshield wipers, comprising a setting switch which is capable of being manually activated, a microcontroller responsive to activation of said setting switch, means for programning a time interval into said microcontroller in response to activation of said setting switch, whereby said microcontroller initiates a sweeping action of said windshield wipers corresponding to the time interval between activations of said setting switch and continues to initiate a sweeping action of said windshield wipers during said programmed time interval until a subsequent activation of said setting switch, and, means for increasing said time interval after setting of said programmed time interval by two subsequent activations of said setting switch.

Additionally, in another aspect of the present invention, there is provided a method for intermittently controlling windshield wipers comprising the steps of (a) providing an apparatus for intermittently controlling windshield wipers comprising a setting switch which is capable of being manually activated, a microcontroller responsive to said activation of said setting switch, and, means for programming a time interval into said microcontroller in response to activation of said setting switch, whereby said microcontroller initiates a sweeping action of said windshield wipers corresponding to the time interval between activations of said setting switch and continues to initiate a sweeping action of said windshield wipers during said programmed time interval until a subsequent activation of said setting switch;

(b) activating said setting switch to initiate a beginning time interval for said program;

(c) activating said setting switch a second time for a second initiation of the wipers, wherein said time interval between the first and second activations is programmed in said microcontroller and said microcontroller continues to initiate said windshield wipers at said programmed time interval; and, (d) changing said time interval without switching off said apparatus.

The apparatus and method of the present invention are extremely valuable in the art of windshield wipers and has as one of its primary goals reducing accidents and improving automobile safety. Other and further advantages of the present invention are set forth in the description and appended claims.

DETAILED DESCRIPTION OF THE PREFERRED EMBODIMENTS

Figure 1:
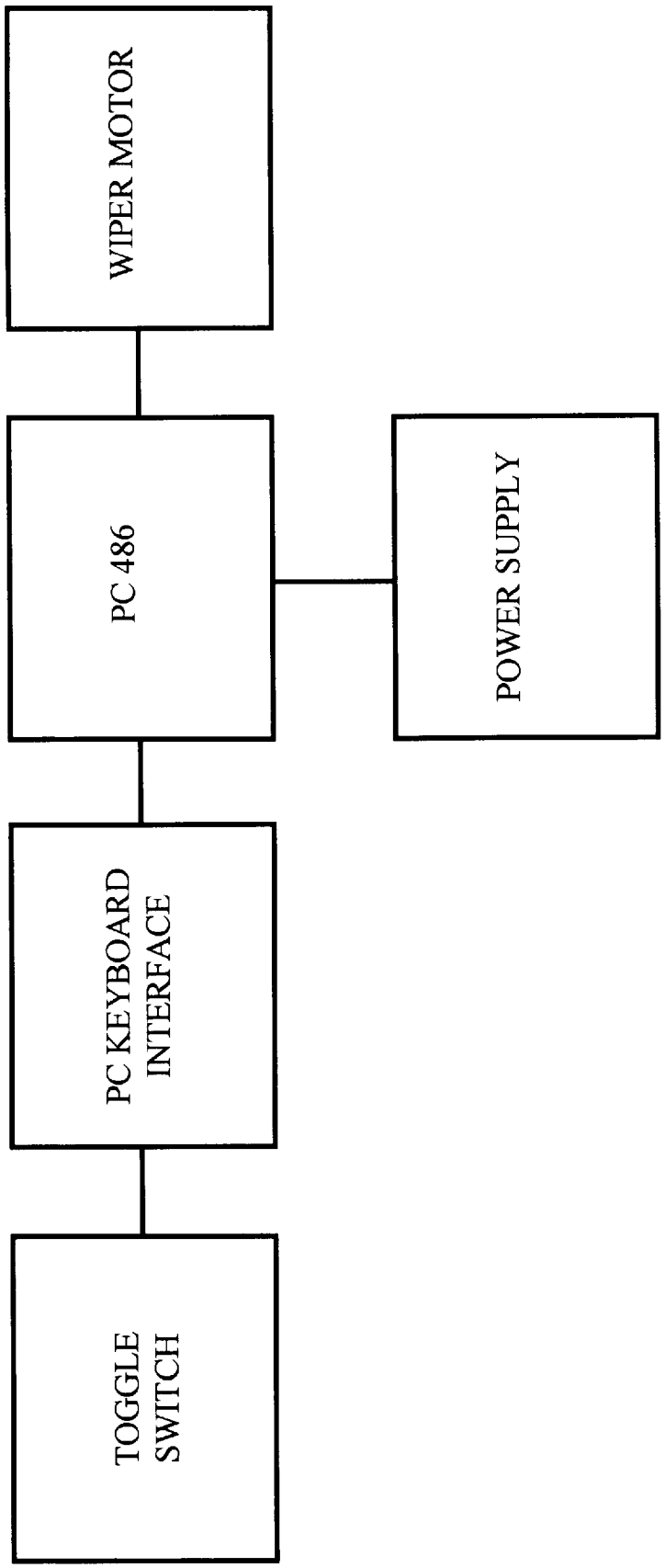
FIG. 1 is a block diagram illustrating a preferred embodiment of the present invention.

The present invention is an apparatus and method for controlling windshield wipers. The apparatus and method allow drivers to select the windshield wiper rate without excessive distractions and/or manual manipulations. The apparatus and method permit drivers to operate a vehicle without the hazards of continually adjusting the windshield wiper rate, yet allows drivers to regulate the exact rate of the windshield wipers with a simple adjustment.

In the preferred embodiment, the apparatus for regulating the rate of windshield wipers includes a setting switch and a microcontroller. Although the setting switch is preferably a push button mechanism, it may be used with a rheostat, rotatory knob, toggle switch or sliding switch. The setting switch is placed in the interior of a vehicle and configured in such as way as to be readily accessible to and operable by the driver or an occupant of the vehicle.

The setting switch activates the microcontroller, which is further connected to the windshield wiper mechanism of a vehicle. For the convenience of the driver, the setting switch has an "on" and "off" mode. The setting switch off-position keeps the setting switch from activating the windshield wipers if the setting switch is accidentally pushed. The setting switch is placed in the on-position by rotating the push button or turn knob configured setting switch clockwise, which then permits the driver to operate the windshield wipers. The setting switch may remain in either the "on" or "off" mode at the discretion of the driver. In either the on-position or off-position, the wipers do not move. Once the wipers are placed in the on-position, the driver may initiate the wipers by pressing the setting switch. In an alternative embodiment, the apparatus may also be designed to have the wipers sweeping at a set rate when the setting switch is placed in the on-position. In still another alternative embodiment, the apparatus may remain in the on-position at all times.

With rain beginning to fall on the windshield and the setting switch in the on-position, the wipers are motionless. The driver pushes the setting switch a single time which sends a signal to the microcontroller. The microcontroller sets an interval timer mechanism corresponding to the time of the setting switch being pushed. With the initial push of the setting switch, the wipers perform a single sweep across the windshield and thereafter remain motionless. Once the continuing rain obscures the driver's vision sufficiently to require the driver to clear the windshield again, the driver pushes the setting switch a second time, which signals the microcontroller to set a second parameter for an interval timer mechanism corresponding with the second push of the setting switch. With the second push, the wipers perform a second sweep of the windshield. At this point in time, the microcontroller initiates the windshield wipers to sweep across the windshield at a rate which is equal to the time interval between the driver's first and second push of the setting switch. Thereafter, the microcontroller initiates the wipers to continuously wipe the windshield at the time interval indefinitely, or until the driver performs an action which further inputs a command into the timer mechanism of the microcontroller. Increasing the wiper rate requires only a single push and decreasing the wiper rate requires only two pushes of the setting switch, as described below.

After the microcontroller has been initially set, and as the rain increases across the windshield, the driver may increase the rate of the wipers with a single push of the setting switch. As the increased rain fall obscures the driver's vision, the initial setting of time interval is not rapid enough to clear the increased rainfall off the windshield. Once the rain obscures the driver's vision sufficiently to require the driver to clear the windshield, the driver pushes the setting switch again. This additional input to the microcontroller resets the time interval of the wiper rate to be equal to the time between the last sweep of the wipers and the moment the driver pushed the setting switch. This new time interval is equal to the time interval that the increased rainfall rate impairs the driver's vision. With this single push of the setting switch, the driver increases the windshield wiper rate, which optimizes the wiper rate to the current rainfall rate.

As the rate of rain accumulation on the windshield decreases, the driver decreases the rate of the wiper sweep by pushing the setting switch two times. In the initial push, the driver holds the setting switch for a two second period. This two second input to the microcontroller resets the time interval of the wipers. The wipers make a single sweep across the windshield and then remain motionless until a second push on the setting switch. With the second push of the setting switch, the wipers sweep the windshield a second time, and the microcontroller is set at a new time interval rate which is equal to the time between the last two wiper sweeps. This new time interval is also equal to the time interval that the driver imputed as the optimum wiper rate for the current rainfall rate.

The method of regulating the wiper rate with the apparatus of the present invention allows a minimum number of actions by the driver, and accordingly the driver encounters a minimum number of distractions. Moreover, the wiper rate is set by the driver to exactly the rate required based on current weather conditions. The initial time interval setting of the apparatus requires only two actions by the driver. Increasing the wiper rate requires a single additional action, and decreasing the wiper rate requires only two additional actions by the driver. The apparatus has an on/off mode as an added safety feature that ensures the apparatus is not activated accidentally. Additionally, the setting switch is a single button which also adds to the convenience and safety of the driver.

The microcontroller of the present invention may be programed in the basic computer programing language, for example using a credit card size i486 based PC module. Any programmable microcontroller can be used with a suitable computer language. Examples of commercially available microcontrollers are the PIC-STIC 1, 2, 3 and 4, and the Dommino BASIC microcontrollers manufactured by Micromint of Vernon, Conn. and the BASIC STAMPS I and II manufactured by Parallax of Rocklin, Calif. with programming techniques which are well known in the art. A sample computer program in MicroSoft Quick BASIC for IBM compatible computers that would be used in the programming of a microcontroller follows:

```
DEF SEG = 0:
REM   THIS IS USED WITH SUBROUTINE 2000 TO CLEAR THE KEYBOARD BUFFER
TOGGLE.UPPER.LIMIT = 120
1       GOSUB 1000:
REM   SOUNDS TUNE AND DISPLAYS FIRST MESSAGE
2       TIME.START = TIMER:
REM   STORES A VALUE OF CLOCK IN TIME.START
GOSUB 2000:
REM   CLEARS THE KEYBOARD BUFFER
GOSUB 3000:
REM   DETERMINES THE INITIAL WIPER INTERVAL
IF INTERVAL.OF.WIPER < 1.5 OR INTERVAL.OF.WIPER > 100 THEN GOTO 1
SOUND 1880 * 4, 5:
REM   MAKE A SOUND AND WIPE WINDSHIELD WIPER
KOUNT = 0
3 GOSUB 4000:
REM   TAKES THE SET WIPER INTERVAL AND RESETS TIMER
REM   IF THE INTERVAL GETS TOO SHORT THE PROGRAM ASSUMES THAT YOU
REM   WANT TO CHOOSE A LONGER TIMING INTERVAL IF THE INTERVAL GETS
REM   LESS THAN 0.15 SECONDS IT WILL RESET
IF INTERVAL.OF.WIPER < 0.15 THEN GOTO 2
REM   BEEP:           REM   MAKE A BEEPING SOUND
SOUND 1880 * 4, 5:    REM   MAKE A SOUND AND WIPE WINDSHIELD WIPER
KOUNT = 0
GOTO 3
END
100
GOSUB 6000:           REM   PLAY TUNE 2
GOSUB 2000:           REM   CLEARS KEYBOARD BUFFER
KOUNT = 0
DO
A$ = INKEY$
LOOP WHILE A$ = " "
PRESSED = ASC(RIGHT$(A$, 1))
IF PRESSED = 27 THEN STOP
IF TIME - TIME.START < 3 THEN STOP
RETURN
2000
REM   KEY DEBOUNCE--THIS SUBROUTINE CLEARS THE KEYBOARD BUFFER.
REM   THIS IS DONE SO THAT ONE PUSH OF THE KEY WILL NOT REGISTER AS
REM   MANY PUSHES. THE FIRST LINE OF WHOLE PROGRAM MUST CONTAIN
REM   THE LINE DEF SEG = 0.
POKE 1050, PEEK(1052): REM   CLEAR KEYBOARD BUFFER
RETURN
3000
REM   THIS SUBROUTINE ENTERS THE INITIAL TIMING INTERVAL. YOU HIT A
REM   KEY AND START THE TIMER AND HIT THE KEY AGAIN TO ENTER END OF
REM   TIMING INTERVAL.
GOSUB 5000:           REM   PLAY TUNE 1
KOUNT = 0
GOSUB 2000:           REM   CLEAR KEYBOARD BUFFER
DO
REM   INTERVAL.OF.WIPER IS THE TIME THAT IT TAKES THE WIPER
REM   TO WIPE
```

```
LOOP UNTIL INKEY$ < > " " OR INTERVAL.OF.WIPER > 100
KOUNT = 0
RETURN
4000
REM   THIS SUBROUTINE DISPLAYS THE TIME BETWEEN WIPES AND WAITS FOR
REM   BETWEEN WIPES AND DISPLAY THE NEW SHORTER INTERVAL ON THE
REM   SCREEN. IF INTERVAL GETS TO SHORT, IT JUMPS OUT OF THIS
REM   SUBROUTINE AND LETS THE USER SET A NEW LONGER TIMING INTERVAL
REM   IN SUBROUTINE 3000
SETPOINT = TIMER + INTERVAL.OF.WIPER
TIME.START = TIMER
GOSUB 2000:          REM   CLEAR KEYBOARD BUFFER
REM   ONCE THE TIMER INTERVAL IS SET THIS ROUTINE WILL JUST KEEP
REM   RESETTING THE TIMER AT EACH INTERVAL UNTIL YOU HIT ANY KEY
REM   WHICH MEANS THAT YOU WANT TO INCREASE THE WIPER RATE
DO
IF INKEY$ < > " " THEN
INTERVAL.OF.WIPER = TIMER - TIME.START
SETPOINT = TIME.START + INTERVAL.OF.WIPER
END IF
LOOP UNTIL TIMER > SETPOINT
RETURN
5000
REM   PLAY TUNE 1
FOR I = 1 TO 3
SOUND 220, 3
SOUND 0, 3
NEXT I
SOUND 440, 3
RETURN
6000
REM   PLAYS TUNE 2
FOR I = 1 TO 3
SOUND 440, 3
SOUND 0, 3
NEXT I
SOUND 220, 3
RETURN
```

FIG. 1 illustrates the present invention using a credit card size i486 based PC module. A toggle switch connects to a VETRA PC keyboard interface, which interfaces between the toggle switch and a PC 486. The apparatus is powered by a power supply which feeds into the PC 486. In response to commands imputed from the toggle switch, through the PC keyboard interface, the PC 486 activates the wiper motor in conformity with the commands received from the toggle switch.

Other programs and microcontrollers will suggest themselves to persons skilled in the art and are acceptable for the present invention, as long as the programs and microcontrollers perform in such away as to permit the proper functioning the of present invention.

EXAMPLE 1

A driver driving down an interstate road encounters a rain storm. As the rain starts to hit the windshield, the driver pushes and quickly releases the setting switch. The wiper wipes the windshield one time and remains motionless. After two minutes, the rain accumulates on the windshield to a point that the driver's vision is obscured by the water on the windshield. At this time, the driver pushes and quickly releases the setting switch a second time. The wipers again wipe the windshield, and two minutes later the wipers wipe the windshield again without the driver's further input, and continue to do so every two minutes thereafter.

EXAMPLE 2

The wipers have been set as exemplified in Example 1, and the wipers are operating at two minute intervals. Four minutes after the initial setting of the wipers, the rain increases. One minute after the rain increases (five minutes from the initial wiper setting), the windshield needs to be wiped, but the initial interval of two minutes will not cause the wipers to wipe for another minute. The driver pushes and quickly releases the setting switch one minute after the last wiper motion of the wipers and five minutes after the initial setting of the wipers. Thereafter, the wipers continue to wipe every one minute.

EXAMPLE 3

The wipers have been set as exemplified in Example 1, and the wipers are operating at two minute intervals. Four minutes after the initial setting of the wipers, the rain decreases, and six minutes after the initial setting of the wipers, the wipers sweep the windshield before the driver's vision is obscured by the falling rain. The driver pushes the setting switch for a two second period, and the wipers immediately sweep across the windshield a single time. Thereafter, the wipers remain motionless. After three minutes, the rain has accumulated on the windshield enough to obscure the vision of the driver. The driver pushes and quickly releases the setting switch, and the wipers immediately sweep across the windshield. The wipers then sweep across the windshield at an interval of every three minutes.

Table 1 shows some examples of setting the time intervals for the present invention after the device is turned on by turning a knob or any other means, for example, a toggle switch, push button, and the like.

TABLE 1

Time Interval Setting For The Intermittent Automotive Windshield Wiper Controller

| Switch operation by driver | Effect | Status of time interval |
|---|---|---|
| push & release | single wipe by wipers | no interval selected |
| second push & quick release | wiper sweep; time interval set | period between two pushes |
| push & quick release after apparatus already activated | wiper sweep; decreased time interval rate | interval time equal to period between last two pushes |
| push for two seconds after apparatus already activated | single wipe by wipers setting new initial set point | no interval selected |
| push & quick release after two second push | wiper sweep; new time period set for wipers | new time period between last two pushes |

It should be understood that the foregoing summary, detailed description, and examples of the invention are not intended to be limiting, but are only exemplary of the inventive features which are defined in the claims.

What is claimed is:

1. An apparatus for intermittently controlling windshield wipers, comprising:
   a setting switch which is capable of being manually activated;
   a microcontroller responsive to said activation of said setting switch; means for programming a time interval into said microcontroller in response to activation of said setting switch, whereby said microcontroller initiates the sweeping action of said windshield wipers corresponding to the time interval between a first and second activation of said setting switch and continues to initiate a sweeping action of said windshield wipers during said programmed time interval until a subsequent activation of said setting switch;
   means for decreasing said time interval;
   means for increasing said time interval;
   wherein said means for programming a time interval is done by twice activating said setting switch with the desired time interval between activations; and
   wherein said means for decreasing said programmed time interval comprises a single subsequent activation of said setting switch at a decreased time interval.

2. The apparatus of claim 1, wherein said increasing said programmed time interval comprises pushing and holding said setting switch for about two seconds, releasing said setting switch and pushing said setting switch a second time at the desired time interval.

3. The apparatus of claim 1, wherein said setting switch is a push button mechanism.

4. The apparatus of claim 1, wherein said setting switch has an on/off position setting.

5. The apparatus of claim 1, wherein said microcontroller comprises a credit card size i486 PC module programmed in BASIC.

6. The apparatus of claim 1, wherein said microcontroller and said setting switch are connected through a PC keyboard interfacing encoder.

7. A method for intermittently controlling windshield wipers comprising the steps of:
   providing an apparatus for intermittently controlling windshield wipers comprising a setting switch which is capable of being manually activated, a microcontroller responsive to said activation of said setting switch, and, means for programming a time interval into said microcontroller in response to activation of said setting switch, whereby said microcontroller initiates a sweeping action of said windshield wipers corresponding to the time interval between activations of said setting switch and continues to initiate a sweeping action of said windshield wipers during said programmed time interval until a subsequent activation of said setting switch;
   activating said setting switch to initiate a beginning time interval for said program;
   activating said setting switch a second time for a second initiation of the wipers, wherein said time interval between the first and second activations is programmed in said microcontroller and said microcontroller continues to initiate said windshield wipers at said programmed time interval; and
   increasing said programmed time interval by activating said setting switch for a period of about two seconds, releasing said setting switch and then reactivating said switch at the desired interval.

8. The method of claim 7, further comprising the step of:
   decreasing said programmed time interval by activating said setting switch a single time at a decreased time interval.

9. The method of claim 7, further comprising the step of placing said setting switch to an on-mode prior to manipulating said setting switch a first time.

10. The method of claim 7, further comprising the step of:
    switching off said setting switch, thereby discontinuing said programed time interval.

* * * * *